United States Patent [19]

Okamoto et al.

[11] Patent Number: 5,452,146
[45] Date of Patent: Sep. 19, 1995

[54] RECORDING CURRENT SETTING METHOD AND AN INFORMATION SIGNAL RECORDING APPARATUS

[75] Inventors: Hiroshige Okamoto; Hiraku Inoue; Yoko Takahashi, all of Kanagawa; Yutaka Miki, Chiba, all of Japan

[73] Assignee: Sony Corporation, Tokyo, Japan

[21] Appl. No.: 161,391

[22] Filed: Dec. 6, 1993

[30] Foreign Application Priority Data

Dec. 28, 1992 [JP] Japan ................................ 4-360264

[51] Int. Cl.⁶ .......................... G11B 5/02; G11B 21/02
[52] U.S. Cl. ........................................ 360/27; 360/101
[58] Field of Search ........................ 360/27, 46, 66, 25, 360/31, 65, 19.1, 68, 21, 74.1, 81, 101

[56] References Cited

U.S. PATENT DOCUMENTS 4,484,237  11/1984  Muto .................................... 360/165
4,553,179  11/1985  Inami et al. ............................ 360/66

FOREIGN PATENT DOCUMENTS 0163505  12/1981  Japan ..................................... 360/66

Primary Examiner—Aristotelis Psitos
Assistant Examiner—Patrick Wamsley
Attorney, Agent, or Firm—Jay H. Maioli

[57] ABSTRACT

A recording current setting method comprises the steps of: recording signals on a tape by changing, by steps, recording current for the tape; detecting a reproduced signal level at each recording current; and determining an optimal recording current from a middle point between a first recording current at which a reproduced signal level first exceeds a threshold level as a result of increasing, by steps, the recording current and a second recording current at which a reproduced signal level first exceeds the threshold level as a result of decreasing, by steps, the recording current. An information signal recording apparatus using the method is also disclosed.

14 Claims, 7 Drawing Sheets

RECORDING CURRENT SETTING METHOD AND AN INFORMATION SIGNAL RECORDING APPARATUS

BACKGROUND OF THE INVENTION

1. Field of the Invention

This invention relates to a recording current setting method and an information signal recording apparatus to control VTR recording current to an optimal value.

2. Description of the Prior Art

According to the prior art, the control to set the recording current of VTR video signals has been so far made as mentioned below. First, signals are recorded on a tape for a preset period, 20 seconds for example, at a certain level of recording current. Then, the tape is rewound to a portion where the signals are recorded. The portion where the signals have been recorded are reproduced, and the level of the reproduced signals is measured at this recording current. Hereafter, the same process is repeated, while changing the recording current. Thus, a relation between recording current and reproduced signal level is determined. From the relation between recording current and reproduced signal level, an optimal level of recording current is obtained.

According to this method, however, time to record signals on a tape and time to rewind the tape are required, so that it takes a long time to obtain an optimal level of recording current.

To overcome this problem, it is proposed to set to an optimal level of recording current by repeating recording and reproduction with a tape remaining stopped.

In other words, the signals are recorded on the tape at a certain level of recording current, by setting the VTR to the recording mode with the tape stopped. Then, by setting the VTR to the reproduction mode, an RF envelope level of the reproduced signals is measured at that recording current. Thereafter, this process is repeated while changing the recording current. Thus, the relation between recording current and reproduced signal level is determined. From the relation between recording current and reproduced signal level, an optimum level of recording current is obtained.

Accordingly, since a relation between recording current and reproduced signal level is obtained by repeating recording and reproduction with the tape remaining stopped, time is not required to rewind a tape, which shortens a time period for setting the recording current.

The optimal setting value for recording current is a recording current where the reproduced signal level thus obtained arrives at its peak in a curve indicating the relation of the reproduced signal level with the recording current. The relation between envelope level of reproduced signals and recording current of video signals can be expressed approximately in a quadratic curve when graphing the change in the recording current logarithmically. According to the measurement data of the video signal recording current and reproduced RF signal envelope level, for example, it is possible to have an approximate expression for the quadratic curve by using the method of least squares, to calculate coordinates which are a vertex of the quadratic curve, and then to set an optimal recording current.

However, the process to seek an approximate expression is complicated, which requires a large program and much time. In particular, when the process is made by an 8-bit microcomputer, there will be an increase in rounding error and a decrease in accuracy.

OBJECTS AND SUMMARY OF THE INVENTION

It is therefore an object of this invention to provide a recording current setting method and an information signal recording apparatus which can set an optimal recording current with ease and without any error, based on measurement data of the envelope levels for recording current and reproduced signal.

According to an aspect of the invention, there is provided a recording current setting method, comprising the steps of:

recording signals on a tape by changing, by steps, recording current for the tape;

detecting a reproduced signal level at each recording current; and determining an optimal recording current from a middle point between a first recording current at which a reproduced signal first level exceeds a threshold level as a result of increasing, by steps, the recording current and a second recording current at which a reproduced signal first level exceeds the threshold level as a result of decreasing, by steps, the recording current.

According to another aspect of the invention, there is provided an information signal recording apparatus, comprising:

a head for reproducing and recording information signals;

a recording and reproducing amplifier for supplying a recording current to the head and for being supplied with a recording current from the head;

a level detection circuit for detecting a recording current to the head; and a control circuit for controlling the recording current according to detection results from the level detection circuit, signals being recorded on a tape by changing, by steps, a recording current for the tape, to detect a reproduced signal level at each recording current, and an optimal recording current being determined from a middle point between a first recording current at which a reproduced signal level first exceeds a threshold level as a result of increasing, by steps, the recording current, and a second recording current at which a reproduced signal level first exceeds the threshold level as a result of decreasing, by steps, the recording current.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
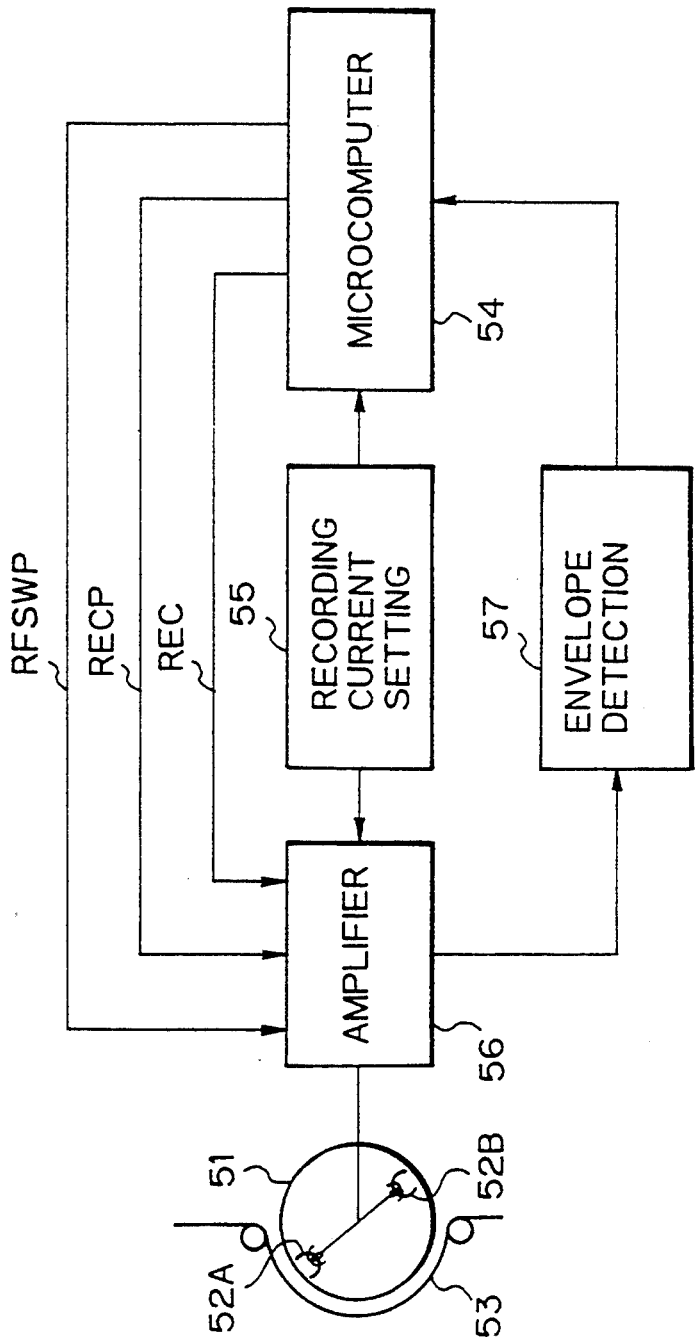
FIG. 1 is a block diagram showing an embodiment of this invention.

An embodiment of this invention will be explained below with reference to the drawings. In FIG. 1, a drum 51 is equipped with heads 52A and 52B. A tape 53 is wound around the drum 51.

Figure 2:
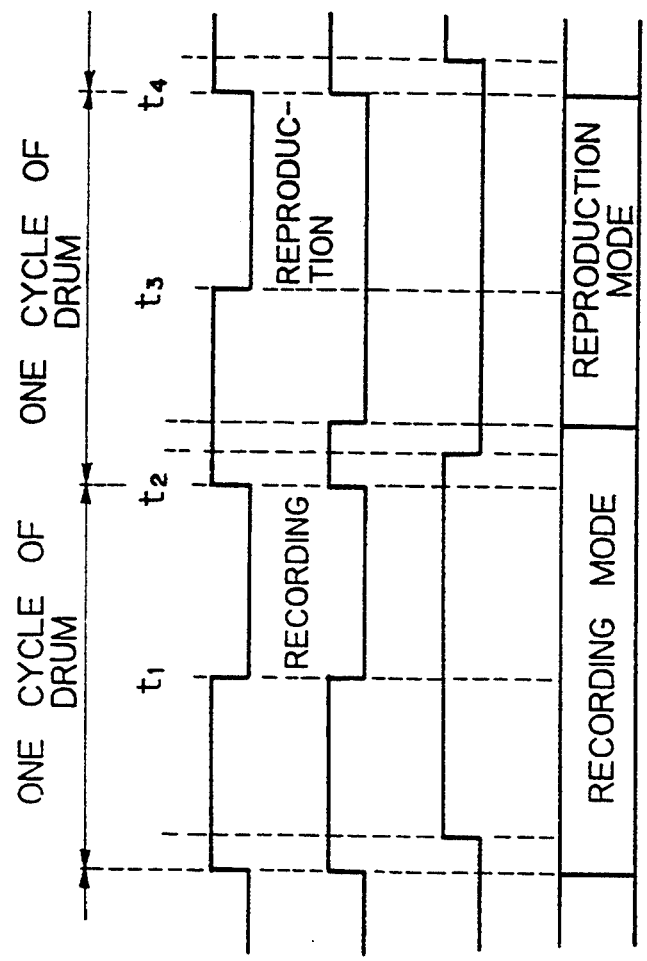
FIGS. 2A to 2D are timing charts used to explain the embodiment of this invention.

As shown in FIG. 2, there are supplied from a microcomputer 54 to a recording/reproducing amplifier 56, a head switching signal RFSW (FIG. 2A), recording pause signal RECP (FIG. 2B) and recording signal REC (FIG. 2C). By the head switching signal RFSW, switching is made between the heads 52A and 52B. Recording is stopped when the recording pause signal RECP is set to "H" while the recording is possible, when the recording pause signal RECP is set to "L". Recording goes on when the recording signal REC is set to "H", while reproduction goes on when the recording signal REC is set to "L". At this time, the recording/reproducing amplifier 56 is set as shown in FIG. 2D.

In setting of recording current, the drum 51 is rotated with the tape 53 remaining stopped. At the minimum rotational period of the drum 51, signals are recorded on the tape 53, at a recording current set in a current setting circuit 55, at the time points $t_1$ to $t_2$. In the next rotational period of the drum 51, the recorded signals on the tape 53 are reproduced at the time points $t_3$ to $t_4$, the reproduced signal level is detected by an envelope detection signal 57, and entered into the microcomputer 54. When the reproduced signal level is obtained, the recording current is changed, and similar processing is repeated. While the above processing is continued, it is possible to obtain a relation between recording current and reproduced RF signal.

Figure 3:
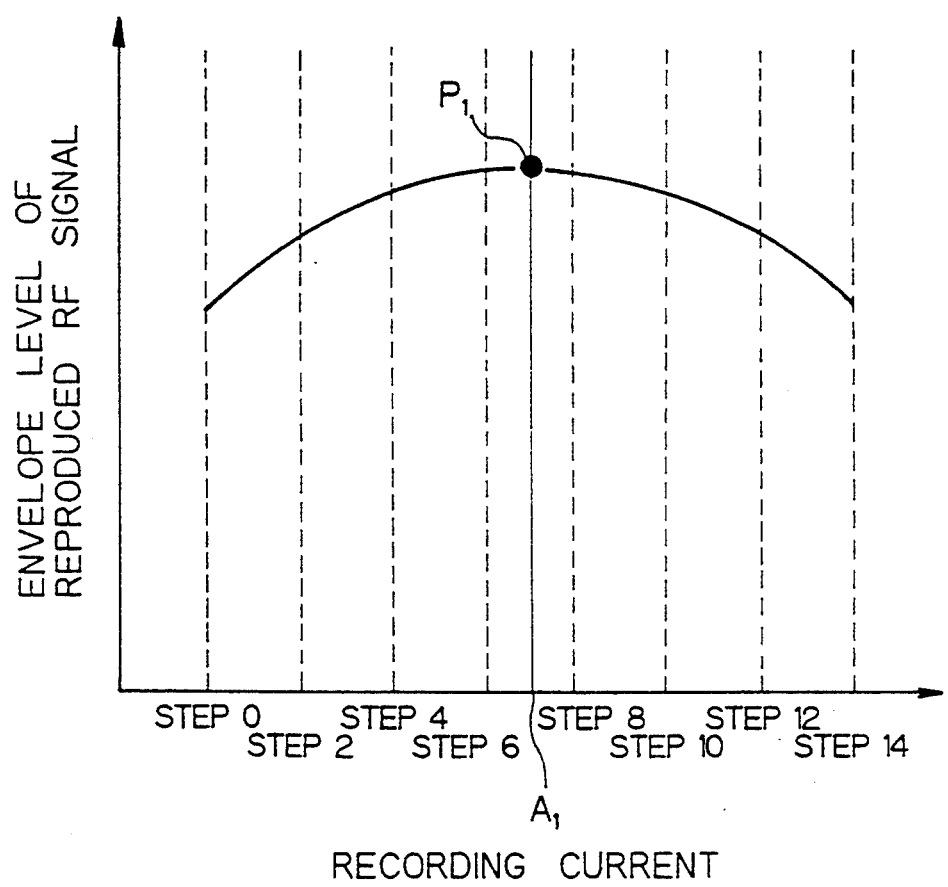
FIG. 3 is a graph used to explain the embodiment of this invention.

When logarithmically graphing the change in the recording current of the video signals, the envelope level of the reproduced RF signals changes almost in a quadratic curve, as shown in FIG. 3. The optimal recording current is the recording current $A_1$, which is the vertex $P_1$ of the quadratic curve.

In an embodiment of this invention, data which exceeds a threshold level is searched from both sides of A, along the x-coordinate in the measured data forming the quadratic curve. Then, an optimal recording current is set by determining the middle point between two measured data exceeding the threshold level.

Figure 4:
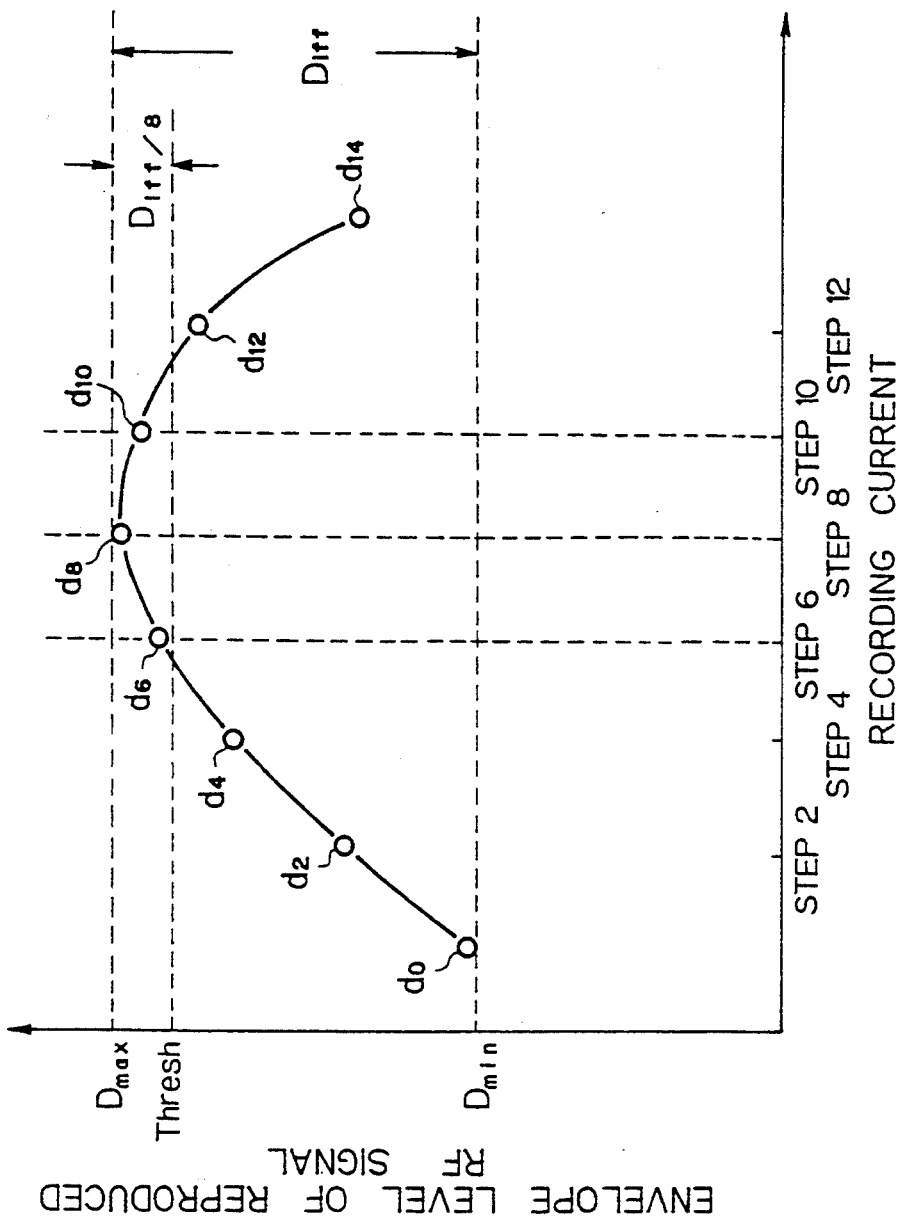
FIG. 4 is a graph used to explain the embodiment of this invention.

For example, it is supposed that data of the reproduced signal level $d_0, d_2, \ldots$ are obtained when changing, by steps, the recording current in the order of the step 0, step 2, ..., as shown in FIG. 4. In this case, search is first made for data which exceeds the threshold level Thresh in the order of $d_0, d_2, \ldots$ (ascending order). In FIG. 4, data $d_6$ in step 6 exceeds the threshold level Thresh. Then, the step 6 becomes the step L.

Search is then made for data which exceeds the threshold level Thresh in the order of $d_{14}, d_{12}, \ldots$ (descending order). In FIG. 4, data $d_{10}$ in the step 10 exceeds the threshold level Thresh. Then, the step 10 becomes the step H.

The recording current at the middle point between the step L and step H is considered as optimal recording current ORC. In FIG. 4, the middle point between recording current in the step 6 and recording current in the step 10 is an optimal current ORC.

Figure 5:
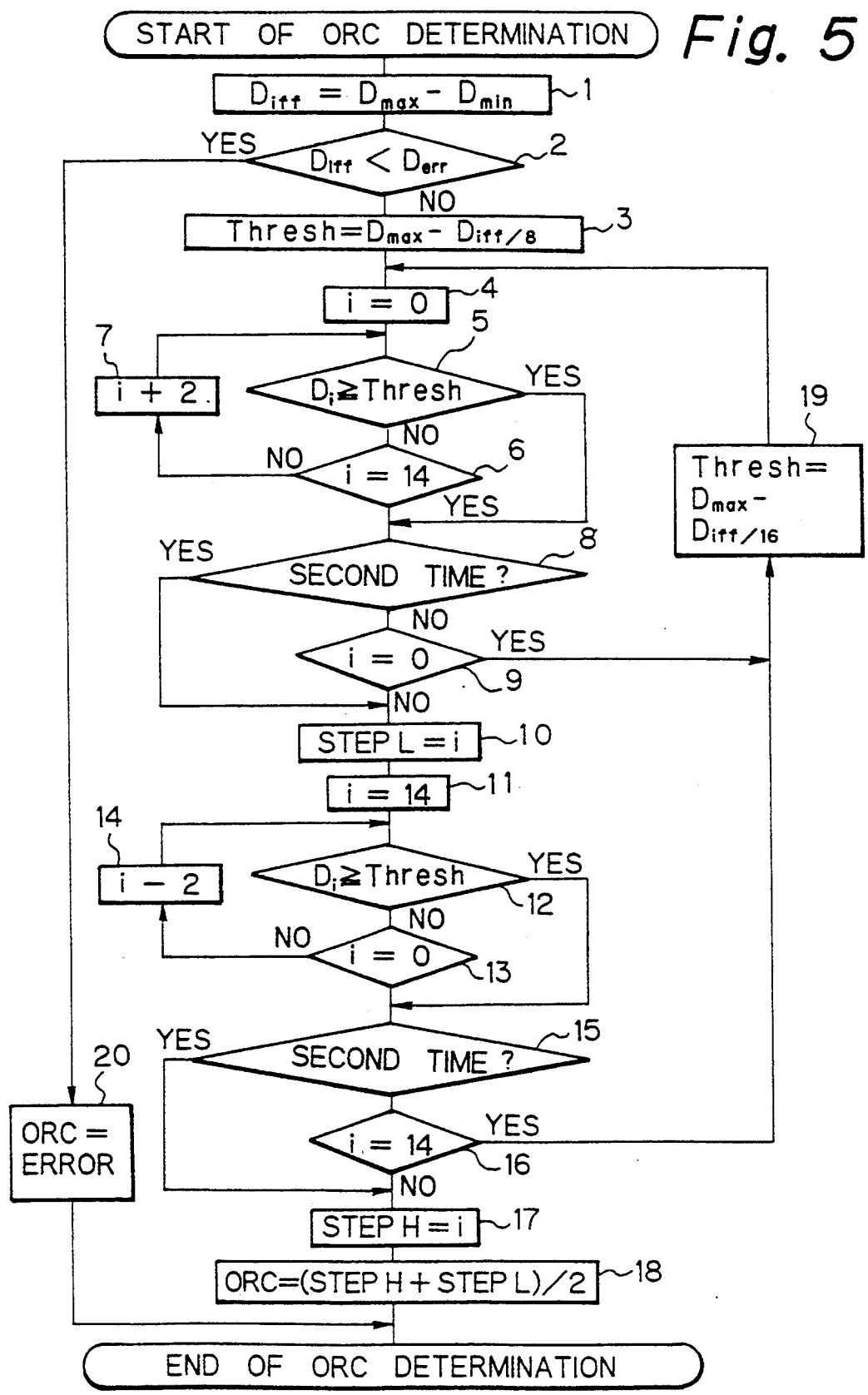
FIG. 5 is a flowchart used to explain the embodiment of this invention.

FIG. 5 is a flowchart showing an example of the processing procedure. The recording current can be changed in 15 steps. In this example, measurement is made in 8 alternate steps. The outline of this processing is as described below.

For the data of 8 steps, subtraction is made between the maximum and minimum data (block 1). The difference is divided by 8, and the maximum data is subtracted by ⅛ times the difference, and the resultant difference becomes the threshold level (block 3).

In the ascending order (from the step 0 where the recording current is smaller, to the step 14 where the recording current is larger), data in each step is compared with the threshold level (block 4, branch block 5, branch block 6, and block 7).

According to the comparison, it can be known that data of which step first exceeds the threshold level. The data which first exceeds the threshold level in the ascending order is the step L (block 10).

On the other hand, in the descending order (from the step 14 where the recording current is larger, to the step 0 where the recording current is smaller), data in each step is compared with the threshold level (block 11, branch block 12, branch block 13, and block 14). The data which first exceeds the threshold level in the descending order is the step H (block 17).

The middle point between the step L which first exceeds the threshold level in the ascending order, and step H which first exceeds the threshold level in the descending order is an optimal recording current (ORC) (block 18).

Reproduction output varies with types of tape used to a large extent. It is therefore impossible to fix a threshold level to a certain value. For this reason, the threshold level is determined by using the maximum and minimum data. In this example, as in the block 3, from the maximum data $D_{max}$ there is subtracted ⅛ times the difference $D_{iff}$ which is obtained by subtracting the minimum data $D_{min}$ from the maximum data $D_{max}$. The resultant difference is the threshold level Thresh. The multiplication by ⅛ is for the convenience of processing. In experimental using trials ¼, ⅛, and 1/16, it has been shown that ⅛ is the best for accuracy.

In cases of defects such as missing magnetic media from a tape, there is often little difference between maximum and minimum values of the measured data. If there is no particular difference between maximum and minimum values of the measured data, measurement is considered to be a failure (branch block 2 and block 20). In this case, a fixed recording current is used.

Figure 6:
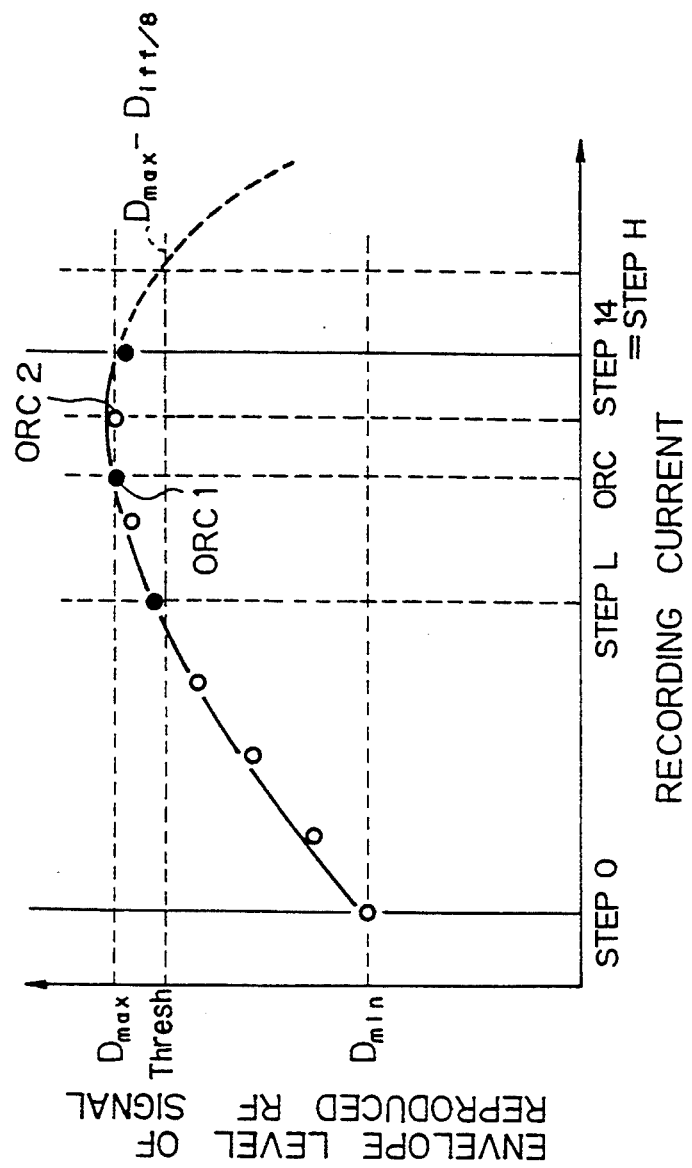
FIG. 6 is a graph used to explain the embodiment of this invention.

The measurement is made only between step 0 and step 14. It may sometimes happen that the step 14 becomes the step H which first exceeds the threshold level in the descending order. As shown in FIG. 6, in this case, if the middle point between step L and step H is considered an optimal value ORC1, there may be a large deviation between optimal value ORC1 and actual peak ORC2.

Figure 7:
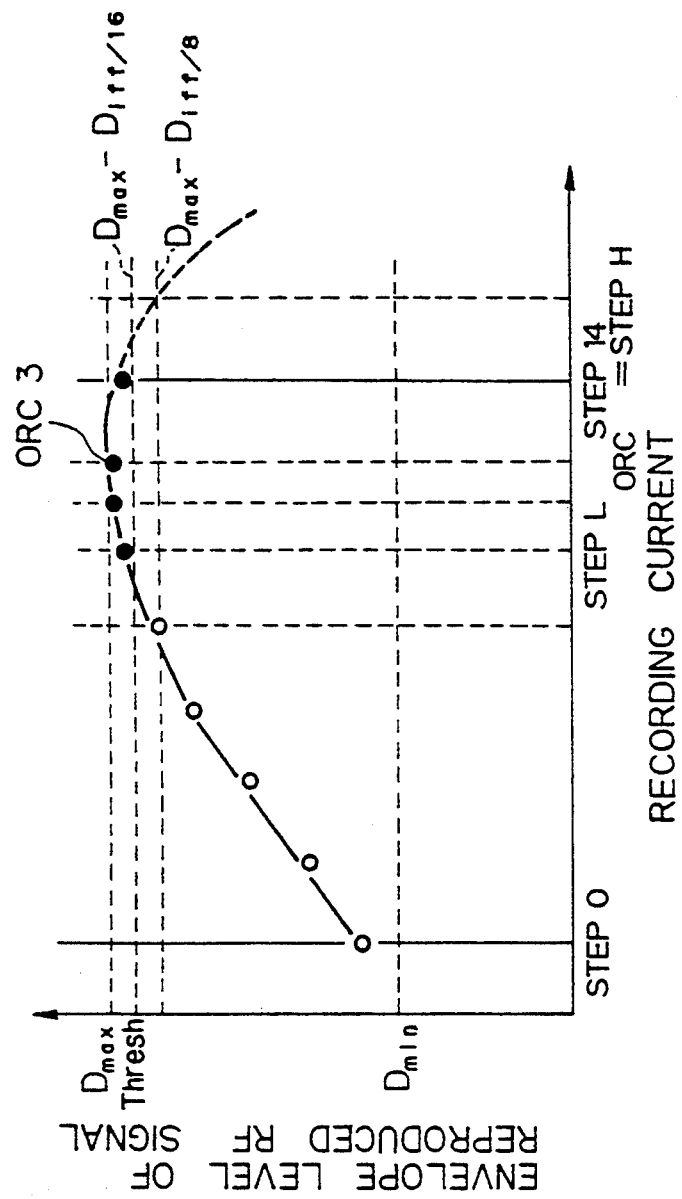
FIG. 7 is a graph used to explain the embodiment of this invention.

Accordingly, when the step 14 becomes the step H, the threshold level is increased to $(D_{max}-D_{iff}/16)$ (branch block 15, branch block 16, and block 19). As a result, the optimal value OCR3 becomes equal to the actual peak value, as shown in FIG. 7. This is applicable also to a case when the step 1 becomes the step L (branch block 8, branch block 9, and block 19).

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

According to this invention, it is possible to obtain high-accuracy and optimal recording current with a simple algorithm, by determining an optimal recording current from the middle point between a first recording current in a step where reproduced signal level first exceeds a threshold level in an ascending order, and a second recording current in a step where reproduced signal level first exceeds the threshold level in descending order.

What is claimed is:

1. A recording current setting method, comprising the steps of:
   recording signals on a tape at a plurality of recording currents between a first and a last recording current by changing, by steps, a recording current for recording said signals, each of said recording signals corresponding to respective ones of the plurality of recording currents being recorded by a recording head on a moveable tape that is held stationary during the recording of said recording signals;
   detecting a plurality of reproduced signal level data between a first and a last signal level data at each recording current; and
   determining an optimal recording current from a logarithmically scaled middle point between a recording current at which one of said reproduced signal level data first exceeds a threshold level by increasing, by said steps, said recording current and another recording current at which another of said reproduced signal level data first exceeds said threshold level by decreasing, by said steps, said recording current.

2. The recording current setting method of claim 1, wherein said threshold level is increased when either the first reproduced signal level data or the last reproduced signal level data exceeds said threshold level.

3. The recording current setting method of claim 2, wherein said threshold level is obtained by subtracting a fractional amount of a difference between a maximum value and a minimum value of said reproduced signal level data from the maximum value of said reproduced signal level data.

4. The recording current setting method of claim 3, wherein the fractional amount is equal to one-eighth.

5. The recording current setting method as claimed in claim 3, wherein an optimal recording current value determined by a relationship between said plurality of reproduced signal level data and said plurality of recording currents is nearly the middle point.

6. The recording current setting method of claim 5, wherein a recording current is not changed if said difference is substantially zero.

7. The recording current setting method of claim 6, wherein said recorded signals are video signals.

8. An information signal recording apparatus, comprising:
   a rotatable head for reproducing and recording information signals at a plurality of recording currents on a movable tape that is held stationary during the recording and reproduction of said information signals at a plurality of recording currents;
   a recording and reproducing amplifier for supplying a recording current to said rotatable head and for being supplied with the recording current from said rotatable head;
   a level detection circuit for detecting the recording current to said rotatable head and for detecting a plurality of reproduced signal level data including a first and a last signal level data; and
   a control circuit for controlling the recording current in accordance with said level detection circuit;
   wherein said information signals are recorded on the tape by changing, by steps, said recording current for said tape, the reproduced signal level data is detected at each said recording current, and an optimal recording current is determined from a logarithmically scaled middle point between a recording current at which one of said reproduced signal level data first exceeds a threshold level by increasing, by said steps, said recording current, and another recording current at which another of said reproduced signal level data first exceeds said threshold level by decreasing, by said steps, said recording current.

9. The information signal recording apparatus of claim 8, further comprising means for increasing said threshold level when either the first reproduced signal level data in such a manner as to increase, by steps, said recording or the last reproduced signal level data exceeds said threshold level.

10. The information signal recording apparatus of claim 9, further comprising means for obtaining said threshold level by subtracting a fractional amount of a difference between a maximum value and a minimum value of said reproduced signal level data from the maximum value of said reproduced signal level data.

11. The information signal recording apparatus of claim 10, wherein the fractional amount is equal to one-eighth.

12. The information signal recording apparatus of claim 11, further comprising means for determining an optimal recording current value by a relationship between said plurality of reproduced signal level data and said plurality of recording currents, said optimal recording current value being nearly the middle point.

13. The information signal recording apparatus of claim 12, wherein a recording current is not changed if said difference is substantially zero.

14. The information signal recording apparatus of claim 13, wherein said information signals are video signals.

* * * * *

UNITED STATES PATENT AND TRADEMARK OFFICE
CERTIFICATE OF CORRECTION

PATENT NO. : 5,452,146
DATED : September 19, 1995
INVENTOR(S) : Hiroshige Okamoto, Hiraku Inoue, Yoko Takahashi & Yutaka Miki It is certified that error appears in the above-identified patent and that said Letter Patent is hereby corrected as shown below:

Col.2, line 21, change "first level" to --level first--
      line 24, change "first level" to --level first--
Col.3, line 14, after "56" delete ","
      line 19, after " "H" " insert --,--
      same line, after "possible" delete ","
      line 47, change, "A," to --$A_1$--
Col.4, line 44, change "using trials" to --trials using--

<u>In the claims</u>:

Col.6, lines 39 & 40, delete "in such a manner as to increase, by steps, said recording"

Signed and Sealed this

Sixteenth Day of September, 1997

Attest:

BRUCE LEHMAN

*Attesting Officer*        *Commissioner of Patents and Trademarks*